United States Patent [19]

Ogasawara

[11] 4,015,346
[45] Apr. 5, 1977

[54] MACHINE FOR USE IN TEACHING THE MANNER IN WHICH A CLOCK INDICATES TIME

[75] Inventor: Toyotsugu Ogasawara, Tokyo, Japan
[73] Assignee: Tomy Kogyo Co., Inc., Tokyo, Japan
[22] Filed: Nov. 24, 1975
[21] Appl. No.: 634,420
[52] U.S. Cl. .................................................. 35/39
[51] Int. Cl.² ........................................ G09B 19/12
[58] Field of Search .......................... 35/39; 58/106

[56] References Cited
UNITED STATES PATENTS

| 2,539,025 | 1/1951 | Lobb | 35/39 X |
| 3,203,115 | 8/1965 | Friday | 35/39 |

FOREIGN PATENTS OR APPLICATIONS

| 17,281 | 12/1915 | United Kingdom | 35/39 |

OTHER PUBLICATIONS

Asahi Overseas Corp. Catalog, Tokyo, Japan NT–588, Time–Teacher Machine, Rec'd Mar. 1970, p. 9.

Primary Examiner—Harland S. Skogquist
Attorney, Agent, or Firm—Edward D. O'Brian

[57] ABSTRACT

A machine for use in teaching the manner in which a clock indicates time appearing more or less as a simulated clock can be constructed so as to utilize a support or housing holding a simulated clock face. Concentric shafts extending through the clock's face are used in conjunction with a mechanical structure for transmitting motion to couple simulated clock hands on the shafts with readout wheels. These wheels are rotatably mounted in the support behind windows through which limited portions of the wheels can be viewed. These windows are normally covered by covers capable of being moved so as to display the portions of the wheels behind them. The wheels are provided with numbers corresponding to positions of the clock hands capable of being viewed through these windows when the covers are lifted. Mechanical structures are employed for the purpose of advancing the clock hands and for the purpose of lifting the covers.

9 Claims, 6 Drawing Figures

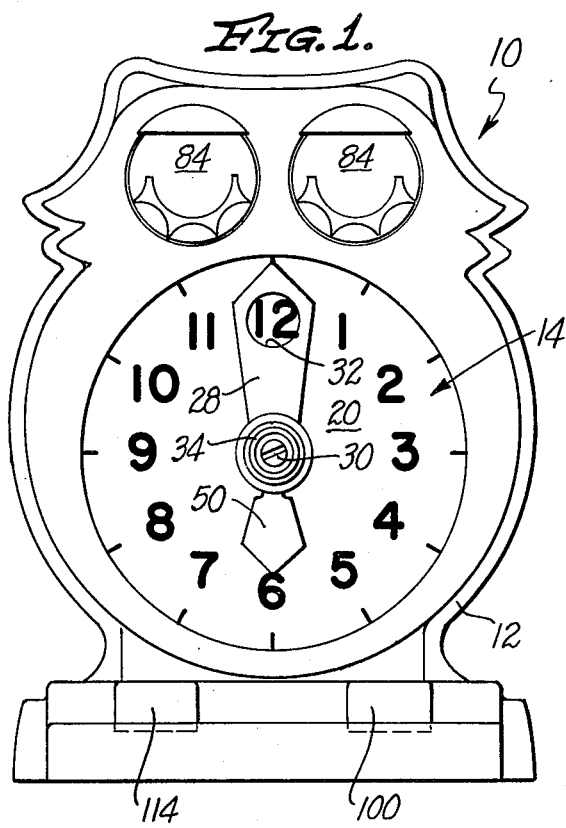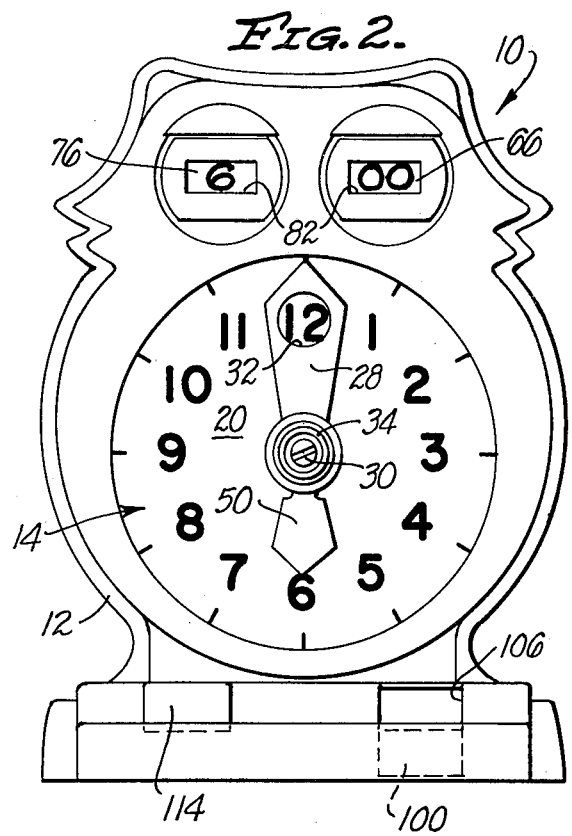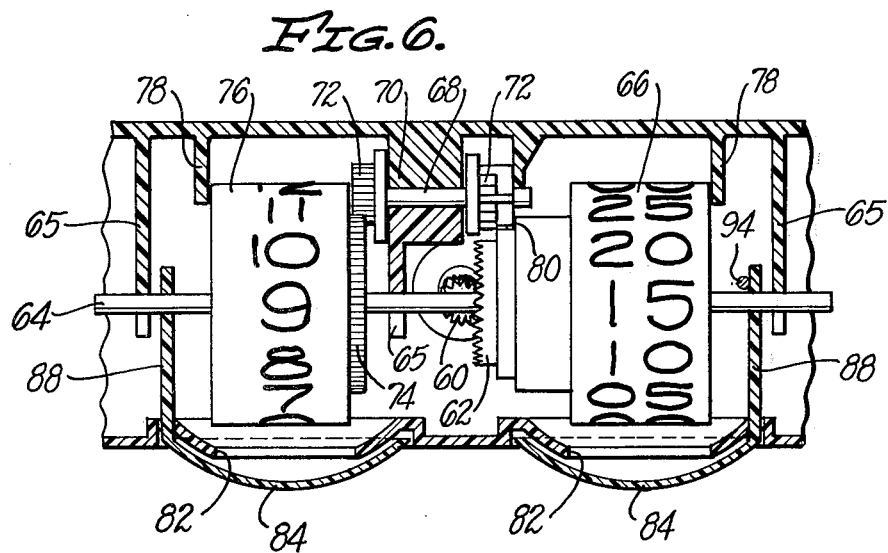

MACHINE FOR USE IN TEACHING THE MANNER IN WHICH A CLOCK INDICATES TIME

REFERENCE TO RELATED PATENTS

Dorr et al. U.S. Pat. No. 2,137,646
Porcelli U.S. Pat. No. 2,406,251
Lobb U.S. Pat. No. 2,539,025
Wilmington U.S. Pat. No. 2,655,739
Pitt U.S. Pat. No. 3,022,582
Friday U.S. Pat. No. 3,203,115
Genin U.S. Pat. No. 3,508,350
Romey U.S. Pat. No. 3,702,507
Pecoraro U.S. Pat. No. 3,829,989

BACKGROUND OF THE INVENTION

The invention set forth in this specification pertains to a machine for use in teaching the manner in which a conventional clock having rotatably mounted hands which turn about an axis indicates time.

It has long been recognized that it is comparatively difficult for children to learn how to "read" a clock so as to "tell" time. The reasons for this are considered to primarily relate to the fact that clocks are normally constructed so as to utilize an hour hand and a minute hand which rotate about a common axis relative to the numerals 1 to 12 disposed on a clock face adjacent to the hands. It is considered comparatively difficult to convey to a child the concept of motion of the minute hand in such a clock indicating numerical values other than those directly displayed on the clock face and to convey to a child the concept that when the hour hand in such a clock is located so as to point between two numerals that the hour hand indicates a numerical value corresponding to a lesser of these numerals.

Such recognition has of course led to the development of a number of different, specific devices for indicating to a child the manner in which a clock indicates time so as to teach the effective utilization of clocks. An understanding of the present invention is not considered to require a complete description of all known instruction devices for use in conveying the manner in which conventional clocks as described indicate time. Many of such devices have been constructed in such a manner as to mechanically couple clock hands with one or more dials which provide a visual readout of the time indicated by the hands of a simulated clock in the form of numerical values. In general prior devices of this category are considered undesirable for teaching purposes because they give a direct indication in numeric form of the time indicated by the positions of clock hands. In other words, when the hands of a simulated clock in such a prior device are in a specific position a child can automatically and concurrently look at a readout mechanism or dial to indicate in numeric form how the positions of the hands should be expressed.

Although devices of this type are unquestionably utilitarian for teaching purposes they suffer from a disadvantage. It is considered that a child in learning to use a clock should not automatically have available a numeric indication of the position of the hands of the clock. When a child has such a numeric indication automatically available the child will frequently not utilize his or her mental powers to determine the numbers indicating the positions of the clock hands, but instead will merely utilize the available numeric indication of the positions of the clock hands. While in time a child can learn to read a clock or to tell time utilizing a simulated clock providing an always available indication of the position of clock hands this type of device is disadvantageous.

This type of device is considered disadvantageous because it does not give a child the opportunity to look at the hands of a clock, to mentally determine the numeric values indicated by the position of such hands in the absence of an indication of such values and then, immediately thereafter, an opportunity to determine if the child's belief as to such numeric values was accurate or not. It is considered that an effective teaching of the use of a clock requires that a child be required to utilize his or her mental capacity and requires that immediately thereafter the child be given an opportunity to check or verify the answer the child has reached.

BRIEF SUMMARY OF THE INVENTION

An objective of the present invention is to provide a new and improved machine for use in teaching the manner in which a clock indicates time. A more specific objective of the invention is to provide a machine or apparatus for this purpose which gives a child an opportunity to utilize his or her mental powers to determine how to express the position of clock hands while the child does not know the proper answer or manner of expressing such position and which then gives the child an opportunity to verify the manner of expression of the position of the hands. This is intended to accomplish an effective, rapid instruction in the use of a conventional dial type clock. Further objects of the invention are to provide machines for the purpose indicated which may be easily and conveniently constructed at a comparatively nominal cost, which are capable of giving prolonged, reliable service with a minimum of maintenance, and which are quite effective for their intended purpose.

In accordance with this invention these objectives are achieved by providing a machine which includes a support; a simulated clock face located on the support; a shaft rotatably mounted so as to extend through the center of the clock face; a simulated clock hand located generally in front of the clock face and connected to the shaft so as to rotate therewith; a readout means for indicating a plurality of numerical values corresponding to the positions of the hands relative to the clock face movably mounted on the support so as to be capable of being moved to a plurality of positions corresponding to the various positions of the hand; mechanical means connecting the shaft to the readout means for moving the readout means as the hand is moved; display means for permitting a specific numerical value on the readout means to be visually inspected; and cover means for covering the portion of the readout means capable of such inspection, the cover means being capable of being moved so as to permit such visual inspection.

A clock constructed as indicated in the preceding paragraph would only have one hand. Although such clocks are known and are on occasion used, normally a clock is constructed so as to have two different clock hands—one indicating minutes and the other indicating hours. A machine of the present invention is preferably constructed to correspond to such a conventional clock and so as to have a second shaft concentrically mounted with the first shaft, a second hand connected to the second shaft and with the readout means having parts, one of which indicates the positions of one of the hands and the other of which indicates the positions of the other of the hands.

BRIEF DESCRIPTION OF THE DRAWINGS

The invention is best more fully explained with reference to the accompanying drawings which illustrate many more facets and features of the machine of the invention than are indicated in the preceding summary. In these drawings:

FIG. 1 is a front elevational view of a presently preferred embodiment or form of a machine in accordance with this invention as the machine appears as it is initially used by a child;

FIG. 2 is a view similar to FIG. 1 indicating how this machine appears as a child is determining numeric indications of the positions of simulated clock hands forming a part of the machine;

FIG. 6 is a partial cross-sectional view taken at line 6—6 of FIG. 3.

Figure 3:
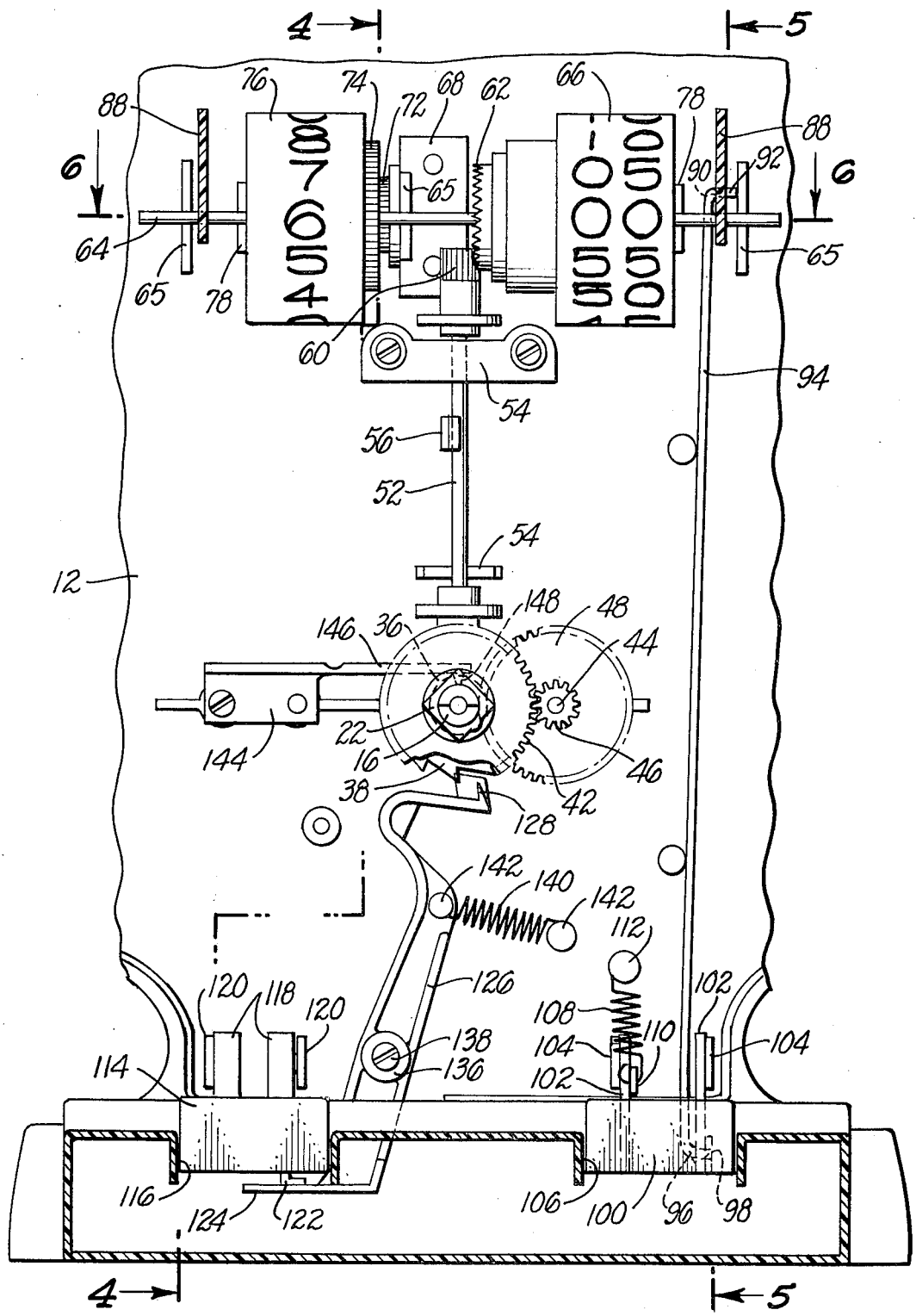
FIG. 3 is an enlarged, partial view, partially in section of the machine shown in FIGS. 1 and 2 with the front of this machine removed.

The particular machine indicated in the various figures of the drawing embodies certain operative concepts or principles of the invention as are set forth and defined in the appended claims. It will be recognized that these concepts or principles can be utilized in a number of somewhat differently appearing and differently constructed simulated clocks and/or teaching clocks through the use of routine engineering or design skill in the toy field.

DETAILED DESCRIPTION

In the various figures of the drawings there is shown a machine 10 for use in teaching the manner in which a clock indicates time. The machine 10 includes a support 12 serving as a housing. This support or housing 12 is preferably constructed in such a manner as to visually attract the attention of a child and so as to include and/or hold a simulated clock face 14. A first shaft 16 is rotatably supported so as to extend through the center of the clock face 14 from the back 18 of the face 14 to the front 20 of this face 14. A second shaft 33 is located concentrically about the shaft 16 and is supported on an enlarged bearing 24 formed on the face 14. Although these shafts 16 and 22 can be supported entirely by the bearing 24 it is preferred to utilize a second bearing 26 on the support 12 for the purpose of holding and supporting the shaft 16.

Figure 4:
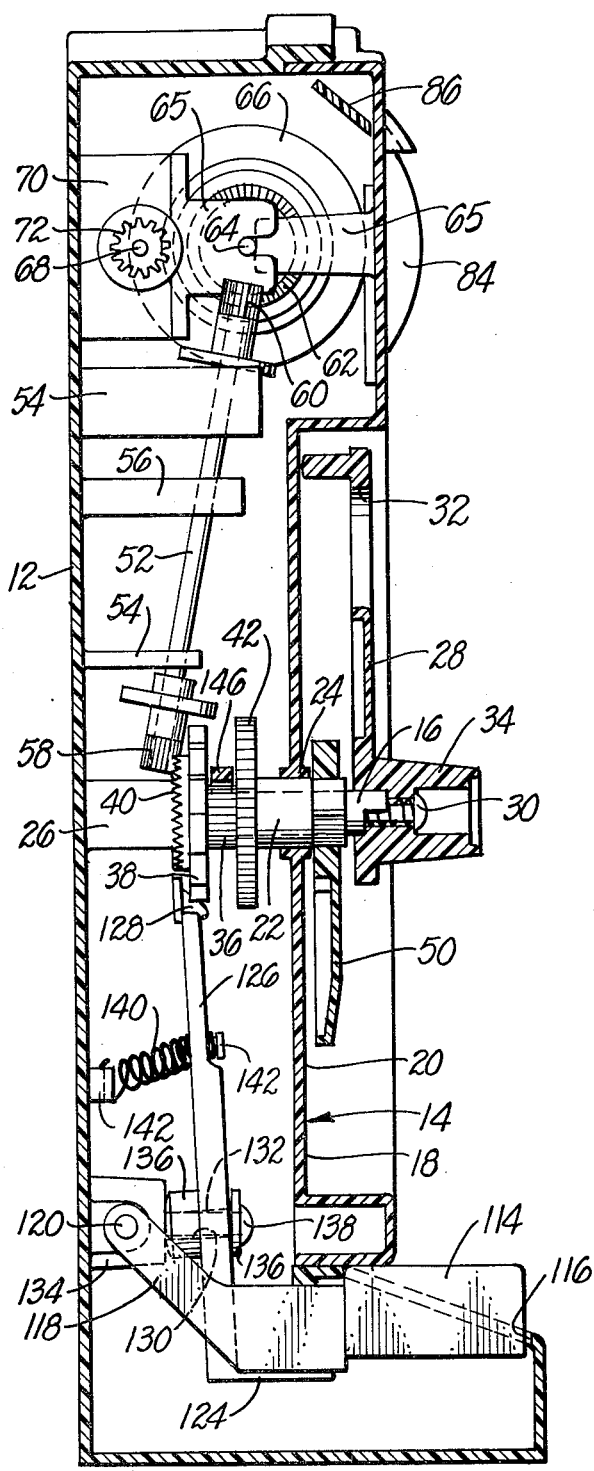
FIG. 4 is a partial cross-sectional view taken at line 4—4 of FIG. 3.
Figure 5:
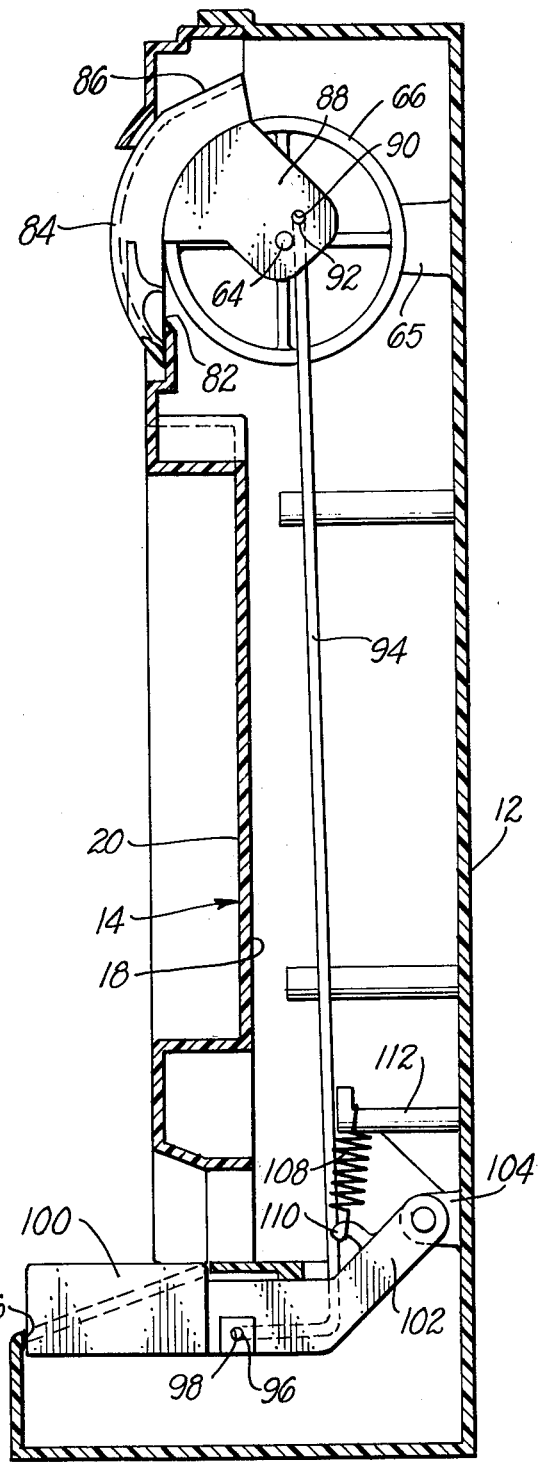
FIG. 5 is a partial cross-sectional view taken at line 5—5 of FIG. 3.

A simulated minute hand 28 is secured to the shaft 16 by means of a screw 30 so as to extend outwardly from the shaft 16 generally parallel to the front 20 of the clock face 14. This hand 28 is preferably provided with an opening 32 through which the various numerals on the clock face 14 may be viewed. It is further preferably provided with a centrally located boss-like handle 34 capable of being manually manipulated so as to turn this shaft 16. The shaft 16 is also preferably integrally formed with a concentric pinion gear 36, a ratchet wheel 38 and a crown gear or wheel 40. These wheels 36, 38 and 40 are located sequentially adjacent to one another as indicated in FIG. 4 of the drawings.

The second shaft 22 is also preferably provided with an integral spur gear 42 located adjacent to the pinion gear 36. A gear train (not separately numbered) consisting of a cross shaft 44 and integral pinion and spur gears 46 and 48, respectively, on this cross shaft 44 is used to transmit motion from the gear 42 to the pinion gear 36. The cross shaft 44 is supported by extending between the back 18 of the clock face 14 and the support 12 so as to be parallel to the shafts 16 and 22. Another simulated hand 50 corresponding to an hour hand on a clock may be secured as by friction to the shaft 22 so as to extend outwardly from this shaft 22 parallel to the front 20 of the clock face 14.

In the machine 10 a motion transmitting shaft 52 is rotatably mounted on bearings 54 located on the support 12 and is held in place by the retainer 56 on this support 12 so as to extend generally upwardly from adjacent to the crown gear 40. This shaft 52 carries a terminal spur gear 58 which mates with the crown wheel or gear 40. It also carries another terminal spur gear 60 which mates with another crown gear or wheel 62 located so as to extend around an additional shaft 64. This shaft 64 is rotatably supported by the support or housing 12 in a conventional manner by bearing brackets 65 so as to extend horizontally above the clock face 14.

This crown gear 62 is secured to a readout wheel or drum 66 which is also rotatably mounted on the shaft 64. A small shaft 68 is also mounted on the support 12 adjacent to and parallel to the shaft 64 by means of a bearing 70. This shaft 68 is provided with gears 72 which are utilized in transferring motion to a gear 74 which is secured to another readout wheel or drum 76 rotatably mounted on the shaft 64. Guide members 78 are located on the support 12 for the purpose of holding these wheels 66 and 76 against linear motion along the length of the shaft 74. A single projection 80 is provided on the periphery of the crown gear 62 for the purpose of partially rotating the shaft 70 an incremental amount each time there is one complete revolution of the crown gear 62. Such motion of the shaft 70 is, of course, transmitted to the wheel 76 so that this wheel 76 will be incrementally rotated a fraction of a turn each time there is a complete revolution of the crown gear 62 and the wheel 66.

These wheels 66 and 76 are located immediately behind openings 82 in the support 12 which are used so as to bracket specific portions of the wheels 66 and 76 in such a manner that such portions can be visually displayed through these openings 82. Thus these openings 82 may be referred to or considered as display means for displaying portions of the wheels 66 and 76. These openings 82 are normally closed through the use of shutter-like covers 84. These covers 84 are connected by a cross wall 86 so as to be capable of being moved in unison with one another. These covers 84 are also supported by end plates 88 rotatably mounted on the shaft 64.

An opening 90 in one of the end plates 88 adjacent to but spaced from the shaft 64 carries an end 92 of a bent motion transmitting rod 94. The other end 96 of this rod 94 is bent so as to fit within an opening 98 in an actuator 100. This actuator 100 includes two support arms 102 which are pivotally mounted to the support or housing 12 through conventional pivots 104. The principal portion of the actuator 100 has essentially a button-like appearance and extends outwardly from the support or housing 12 through an opening 106 located generally beneath the clock face 14.

With this structure whenever the actuator 100 is pushed downwardly the covers 84 are pivoted so as to uncover the openings 82. Although it is possible to weight these covers 84 so that they will automatically return to a closed position when the actuator 100 is disengaged it is considered preferable to bias the actuator 100 to a position in which the covers 84 are in a closed position through the use of a coil spring 108. This spring 108 connects a hook 110 on one of the arms 102 and a bracket 112 on the support or housing 12.

The machine 10 also includes another actuator 114 which is shaped substantially as the actuator 100. This actuator 114 extends through another opening 116 in the support or housing 12 and includes two arms 118 which are supported upon conventional pivots 120 on the support or housing 12. When this actuator 114 is pushed downwardly a foot 122 on it engages a platform 124 on an elongated lever 126. In a sense this lever 126 may be considered as a pawl although more precisely it holds a pawl 128 which is adapted to engage and rotate the ratchet wheel 38. This pawl 128 is partially of a sloping, cam-like configuration as shown.

The lever 126 itself is provided with a hole 130 intermediate its ends which fits loosely around a pin 132 extending from a bracket 134 on the support or housing 12. This hole 130 is preferably larger than the pin 132 so that the lever 126 is held in such a manner that it be both rotated in a plane transverse to the axis of the pin 132 and so that it can be rotated in such a manner as to rock on the pin 132 so that the pawl 128 is capable of movement toward and away from the ratchet wheel 38. In a sense this connection of the lever 126 on the pin 132 is a type of a universal joint permitting several degrees of movement.

Preferably washers 136 and a head 138 on the pin 132 are used to hold the lever 126 on the pin 132. The position of the lever 126 is primarily achieved through the use of another coil spring 140 secured to the support or housing 12 and the lever 126 through the use of conventional connectors 142. This spring 140 is located as shown in FIGS. 3 and 4 so as to bias the lever 126 in a position in which the pawl 128 is spaced from the ratchet wheel 38 in which the actuator 114 is held in an "up" position.

When the actuator 114 is pushed down sliding contact between the foot 122 and the platform 124 causes the lever 126 to rock on the pin 132 so as to bring the pawl 128 generally within the plane of the ratchet wheel 38. Then as the actuator 114 is further moved downwardly the lever 126 is rotated about the pin 132 so as to advance the ratchet wheel 38 an incremental amount. When the actuator 114 is released the lever 126 moves by virtue of the action of the spring 140 so as to return the actuator 114 to an up position as illustrated and so as to space the pawl 128 from the ratchet wheel 38 so that the actuator 114 may be again engaged and pushed so as to again advance the ratchet wheel 38.

The machine 10 also includes another support bracket 144 which carries an elongated, resilient arm 146 serving as a detent member. This arm 146 extends between the ratchet wheel 38 and the gear 42 in such a manner as to engage the pinion gear 36 so as to prevent inadvertent or accidental movement of the shaft 16. In effect, this arm 146 engages the pinion gear 36 so as to act essentially as a detent to control the pinion gear 36 and the shaft 16 so that the shaft 16 can be stopped only in locations corresponding to different specific positions of the readout wheel 66. The arm 146 can exercise this function by merely bridging adjacent teeth of the gear 36. If desired it may be provided with a small bump 148 which fits between two such adjacent teeth.

It is believed that the manner of use of the machine 10 will be more or less self-evident from the preceding description. The hands 28 and 50 may be advanced in sycronism with one another by either rotating the handle 34 or by pushing down on the actuator 114. By virtue of the operation of the arm 146 the hands 28 and 50 will be at rest only after they have been moved into position in which specific numbers of a sequence of numbers corresponding to the number of minutes in an hour are displayed on the wheel 66 through an opening 82.

By virtue of the mechanical connection described between the wheels 66 and 76 when a specific number is displayed on the wheel 66 behind an opening 82 another number corresponding to the number of an hour indicated on the clock face 14 will be displayed through another opening 82 on the wheel 76. Thus at all times the wheels 66 and 76 will be positioned so that only a specific number is adjacent to an opening 82. The number indicated on the wheel 76 will indicate hours while the number indicated on the wheel 66 will indicate minutes. Preferably the numbers indicated on the wheel 66 will not indicate all of the normal 60 minutes in an hour but will only indicate specific minute figures which are separated from one another by the same time interval. Thus, with the embodiment of the invention shown the wheel 66 indicates five minute time increments.

When the hands 28 and 50 are in any specific position a child will be able to view these hands 28 and 50 so as to indicate to himself or herself or to a teacher the numeric value corresponding to these positions. Then such a child can push upon the actuator 100 so as to uncover the openings 82 so as to be able to visually determine from the indicia displayed on the wheels 66 and 76 through the openings 82 whether or not the user was correct in "reading" the positions of the hands 28 and 50. After the machine 10 has been operated in this manner it can be actuated so as to change the position of the hands 28 and 50 and the whole process may be repeated.

The machine 10 is considered quite desirable in that it utilizes simple rotary wheels or drums—the wheels or drums 66 and 76—as a readout structure or readout means for indicating a plurality of numerical values corresponding to the positions of the hands 28 and 50. It is considered advantageous to utilize in the machine 10 the simple mechanical structure or mechanical means described in the preceding for advancing these wheels 66 and 76 in accordance with the movements of the hands 28 and 50 and in accordance with the movements of the shafts 16 and 22. Because these two shafts 16 and 22 are syncronized together as described only rotation of a single member—the shaft 52—is necessary to advance the readout structure described.

I claim:

1. A machine for teaching the manner in which a clock having at least one rotary hand indicates time, which machine comprises:

a support, a simulated clock face located on said support so that the front thereof is exposed, said clock face having a center, a first shaft rotatably mounted with respect to said clock face and extending through the center of said clock face from the front thereof to the back thereof, a second shaft rotatably mounted around said first mentioned shaft, said second shaft also extending through the center of said clock face from the front thereof to the back thereof, a first simulated clock hand connected to said shaft so as to rotate therewith, said hand being located in front of said clock face and extending generally parallel to said clock face, a second simulated clock hand, said second hand being connected to said second shaft so as to rotate therewith, said second hand also being located in front of said clock face and extending generally parallel to said clock face, readout means for indicating a plurality of numerical values corresponding to positions of said hand relative to said clock face movably mounted on said support so as to be capable of being moved to a plurality of positions corresponding to various positions of said hand relative to said clock face, said readout means having parts, one of said parts for indicating positions of said first mentioned hand relative to said clock face and the second of said parts for indicating positions of said second hand relative to said clock face, mechanical means for moving said readout means as said hand is moved, said mechanical means connecting said shaft and said readout means, said mechanical means includes gear means for transmitting motion coupling said first mentioned shaft and said second shaft so that said shafts can be rotated in syncronism with one another so as to provide a single mechanical output and a single motion transmission means for transmitting rotation coupling one of said shafts and said readout means, actuating means for causing rotation of at least one of said shafts, display means for permitting a specific numerical value on said readout means to be visually inspected, said display means being located adjacent to said readout means, cover means for covering the portion of said readout means capable of being visually inspected, said cover means being capable of being moved relative to said display means and said readout means so as to permit visual determination of a specific numerical value on said readout means.

2. A machine as claimed in claim 1 wherein:
said mechanical means also includes detent means for controlling said mechanical means so that said mechanical means will only be at rest in predetermined positions.

3. A machine as claimed in claim 1 wherein:
said actuating means comprises a handle means capable of being manually engaged connected to one of said shafts and extending therefrom in front of said clock face.

4. A machine as claimed in claim 1 wherein:
there are two of said actuating means for causing rotation of said shafts, the first of said actuating means comprising handle means capable of being manually engaged connected to one of said shafts and extending therefrom in front of said clock face, the second of said actuating means comprising a ratchet means for transmitting motion connected to one of said shafts, pawl means for engaging and moving said ratchet means movably mounted adjacent to said ratchet means and lever means for moving said ratchet means relative to said pawl means.

5. A machine as claimed in claim 1 wherein:
said actuating means comprises ratchet means for transmitting motion connected to one of said shafts, pawl means for engaging and moving said ratchet means movably mounted adjacent to said ratchet means and lever means for moving said pawl means relative to said ratchet means, said mechanical means also includes detent means for controlling said mechanical means so that said mechanical means will only be at rest in predetermined positions, said ratchet means comprises a ratchet wheel mounted on one of said shafts, said pawl means comprises an arm pivotally mounted on said support so that an end thereof is located adjacent to said ratchet wheel, so that said arm is capable of being pivoted relative to said ratchet wheel, to move said end thereof into engagement with said ratchet wheel and so that said arm is capable of being tilted relative to said ratchet wheel so that the said end thereof is spaced from said ratchet wheel, biasing means for biasing said arm so that said end thereof is normally spaced from said ratchet wheel, said lever means is capable of being moved into contact with said arm so as to tilt said arm in order to bring said end into engagement with said ratchet wheel and so as to cause said end to rotate said ratchet wheel as said lever means is actuated, there are two of said actuating means for causing rotation of said shafts, the first of said actuating means comprising handle means capable of being manually engaged connected to one of said shafts and extending therefrom in front of said clock face, the second of said actuating means comprising a ratchet means for transmitting motion connected to one of said shafts, pawl means for engaging and moving said ratchet means movably mounted adjacent to said ratchet means and lever means for moving said ratchet means relative to said pawl means.

6. A machine as claimed in claim 1 wherein:
said actuating means comprises ratchet means for transmitting motion connected to one of said shafts, pawl means for engaging and moving said ratchet means movably mounted adjacent to said ratchet means and lever means for moving said pawl means relative to said ratchet means.

7. A machine as claimed in claim 6 wherein:
said ratchet means comprises a ratchet wheel mounted on one of said shafts, said pawl means comprises an arm pivotally mounted on said support so that an end thereof is located adjacent to said ratchet wheel, so that said arm is capable of being pivoted relative to said ratchet wheel, to move said end thereof into engagement with said ratchet wheel and so that said arm is capable of being tilted relative to said ratchet wheel so that the said end thereof is spaced from said ratchet wheel, biasing means for biasing said arm so that said end thereof is normally spaced from said ratchet wheel, said lever means is capable of being moved into contact with said arm so as to tilt said arm in order to bring said end into engagement with said ratchet wheel and so as to cause said end to rotate said ratchet wheel as said lever means is actuated.

8. A machine for use in teaching the manner in which a clock having rotary hands indicates time which comprises:

a housing having a simulated clock face located on the exterior thereof and having two openings leading from the interior thereof to the exterior thereof, a first rotary member rotatably mounted within said housing so that a portion of its periphery is adjacent to and can be viewed through one of said openings, a second rotary member rotatably mounted within said housing so that a portion of its periphery is adjacent to and can be viewed through the other of said openings, a simulated minute hand and a simulated hour hand rotatably mounted on said housing so as to be capable of being rotated relative to said clock face, a first mechanical means for causing both of said hands to rotate in synchronism with one another and for producing a single mechanical output corresponding to the rotation of both of said hands, said first mechanical means being connected to both of said hands, a single motion transmitting means for conveying said output so that it can be used in rotating both of said rotary members, said motion transmitting means being connected to said first mechanical means and a second mechanical means for rotating said first rotary member in accordance with the rotation of said minute hand and for rotating said second rotary member in accordance with the rotation of said hour hand through the use of the motion transmitted by said motion transmitting means, said second mechanical means connecting said motion transmitting means to both of said rotary members, a plurality of indicia indicating the time in hours indicated by the position of said hour hand on said clock face located on said second rotary member, a plurality of indicia indicating the number of minutes indicated by the position of said minute hand on said clock face located on said first rotary member, selective of said indicia on said rotary members depending upon the positions of said rotary members being visible through said openings, cover means for covering said openings so as to prevent viewing of the portions of said rotary members adjacent to said openings, means for opening said cover means so as to permit viewing of the portions of said rotary members adjacent to said openings.

9. A machine as claimed in claim 8 including:

means for biasing said cover means in a closed position so as to conceal said rotary member from view.

* * * * *